United States Patent
Von Geldern et al.

(10) Patent No.: US 6,749,373 B2
(45) Date of Patent: Jun. 15, 2004

(54) INSTALLATION FOR FEEDING A PLURALITY OF LOADS/CELLS OF ALUMINUM MELTING FURNACES WITH BULK MATERIAL SUCH AS ALUMINUM OXIDE

(75) Inventors: Klaus Von Geldern, Hamburg (DE); Volkmar Irmscher, Wedel (DE); Heino Sorger, Winsen/Luhe (DE)

(73) Assignee: Moller Materials Handling GmbH (DE)

( * ) Notice: Subject to any disclaimer, the term of this patent is extended or adjusted under 35 U.S.C. 154(b) by 0 days.

(21) Appl. No.: 10/318,829

(22) Filed: Dec. 13, 2002

(65) Prior Publication Data

US 2003/0116406 A1 Jun. 26, 2003

(30) Foreign Application Priority Data

Dec. 13, 2001 (DE) .......................................... 101 62 398

(51) Int. Cl.[7] .............................................. B65G 53/66
(52) U.S. Cl. .............................. 406/23; 406/93; 406/95; 406/156; 406/109; 110/186
(58) Field of Search ............................ 110/186; 406/19, 406/23, 93, 94, 95, 156, 109

(56) References Cited

U.S. PATENT DOCUMENTS

| | | | | |
|---|---|---|---|---|
| 3,689,045 A | * | 9/1972 | Coulter et al. ................ | 266/82 |
| 3,753,867 A | * | 8/1973 | Wiemer ...................... | 202/262 |
| 3,945,683 A | * | 3/1976 | Wise .............................. | 406/3 |
| 4,389,949 A | * | 6/1983 | Heep ..................... | 110/101 CF |
| 4,482,275 A | * | 11/1984 | Shinozaki et al. ............. | 406/12 |
| 4,529,336 A | * | 7/1985 | Shinozaki et al. ............. | 406/14 |
| 4,582,454 A | * | 4/1986 | Brandenburg et al. ......... | 406/32 |
| 4,599,017 A | * | 7/1986 | Russemeyer et al. ......... | 406/95 |
| 4,758,118 A | * | 7/1988 | Rachner et al. ............... | 406/24 |
| 4,774,893 A | * | 10/1988 | Dumbaugh ................. | 110/186 |
| 6,332,408 B2 | * | 12/2001 | Howlett et al. ............. | 110/189 |

FOREIGN PATENT DOCUMENTS

| | | |
|---|---|---|
| DE | 26 46 130 | 6/1980 |
| DE | 3310452 A1 | 9/1984 |
| EP | 0 122 925 B1 | 9/1986 |
| EP | 0 224 436 A1 | 7/1989 |

* cited by examiner

*Primary Examiner*—Joseph A. Dillon
(74) *Attorney, Agent, or Firm*—Wall Marjama & Bilinski

(57) ABSTRACT

The present invention is directed to an Installation for feeding a plurality of loads, e.g. cells of aluminum melting furnaces, with a bulk material such as pulverized aluminum oxide. The installation includes a silo for the bulk material. The silo includes a pressure vessel or pump delivering machinery which is connected with a conveying line. A plurality of receiving vessels are connected with the conveying line via valves in the vicinity of the furnace loads. The receiving vessels are connected to the plurality of loads of the furnaces by at least one pneumatic conveying chute or pneumatic pipe channel. Each conveying chute or pipe channel includes at least one discharge per load.

9 Claims, 3 Drawing Sheets

INSTALLATION FOR FEEDING A PLURALITY OF LOADS/CELLS OF ALUMINUM MELTING FURNACES WITH BULK MATERIAL SUCH AS ALUMINUM OXIDE

BACKGROUND OF THE INVENTION

1. Field of the Invention

The present invention relates generally to aluminum melting furnaces, and particularly to an installation for feeding cells of aluminum melting furnaces with bulk material such as pulverized aluminum oxides.

2. Technical Background

In one approach that has been considered, an installation includes an aluminum oxide storage bunker is connected with a pneumatic (air fluidizing) conveying chute. The conveying chute comprises a multiplicity of lateral discharges, each of the lateral discharges being connected with a pneumatic conveying chute. Each chute includes separate discharges for the individual cells of the aluminum melt furnace.

In another approach that has been considered, an installation for feeding bulk material containers includes a pneumatic conveying line that is connected with the containers by way of a valve arrangement. The valve arrangement is such that each valve closes automatically when the fill level in the container reaches a predetermined value. One drawback to the aforementioned approaches relates to the high energy consumption involved in supplying large furnaces that include a multiplicity of cells.

What is needed is an installation for feeding an aluminum melt furnace having a plurality of loads (e.g. cells), with pulverized aluminum oxide. It is desirable that the installation be equipped to supply of a large number of cells while consuming a relatively low amount of energy.

SUMMARY OF THE INVENTION

The present invention addresses the above described needs. The present invention provides an installation that is capable of feeding pulverized aluminum oxide to an aluminum melt furnace having a plurality of cells. The installation of the present invention is equipped to supply of a large number of cells while consuming a relatively low amount of energy.

One aspect of the present invention is an Installation for feeding a plurality of cells of aluminum melting furnaces with bulk material, such as pulverized aluminum oxide. The installation includes a silo for storing aluminum oxide. The silo is connected with a pressure vessel or pump delivering machinery, which on its part feeds a pneumatic conveying line (or air conveyer). Pressure vessel or pump delivering machineries are used to convey bulk material for long distances while consuming relatively low amounts of energy. It is therefore possible to deliver the aluminum oxide material to a plurality of acceptance sites disposed at different locations. According to the invention, so-called receiving or intermediate vessels are coupled to the conveying lines in the vicinity of the aluminum melt furnace. The receiving vessels are connected to the conveying line via valves. Each receiving vessel itself is connected with the cells of the aluminum melt furnace by at least one pneumatic conveying chute. The pneumatic conveying chute includes a discharge mechanism for each cell of the furnace.

A pneumatic conveying chute for conveying bulk material has the considerable advantage that a pressure-tight sealing of the furnace cells is not required. Upon using a pneumatic conveying line at this point, a pressure-tight sealing is indispensable, because otherwise considerable amounts of dust would leak out of the furnace cells and would contaminate the area surrounding the furnace.

It is understood that above and below the conveying chute, a tube may be employed that includes a separate channel in its downward region that can be flushed with air. In upward direction the tube is permeable, such that the desired fluidization of the conveyed bulk material is achieved.

When rigidly connecting the conveying chute with the receiving vessel and the corresponding entry to the cells of the aluminum melt furnace, the risk exists that an adjustment of the conveying chutes in longitudinal direction is required because of the structural arrangements. Therefore another embodiment of the invention provides that the conveying chutes have a first chute segment connected with the receiver vessel, and a second segment which is connected with the lateral discharge and which co-operates with the first chute segment in a telescopic manner. Thus a spatial adaptation of the conveying chutes is realized. Furthermore it is possible to change the position of the receiving vessel without having to change the junctions on the aluminum melt furnace and the conveying chutes, respectively.

The second segment co-operating in a telescopically manner with the first chute segment can also be constructed as a pneumatic conveying line by providing it with a sieve-shaped aerating plate and connecting it to a compressed air source. Thus it is guaranteed that a problem-free conveying of the bulk material up to the discharge, e.g. to the aluminum melt furnace, is secured.

The fill-up valve between the pneumatic conveying line and the receiving vessel is controllable. It must naturally be prevented that the receiving vessel is congested and causes a jam in the conveying line under certain circumstances. According to the invention, a controlling means for actuating the valve is therefore provided, and the controlling means responds to a fill level indicator device, which detects when the level in the receiving vessel reaches a predetermined upper value.

It is conceivable to provide for a second fill level indicator in the receiving vessel, which responds when the receiver is approaching the state of emptiness. In this case, the valve is then opened again. During the operation of the aluminum melt furnaces, e.g. aluminum oxide is discontinuously conveyed through the pneumatic conveying line. As the consumption per time unit is known, the delivery per time unit can be accommodated to this consumption. This also holds for the receiver vessel, so that a fill level measurement for the downward level may also be omitted. If appropriate, the valve can be controlled in a time-dependent manner, namely, it can be opened after a certain time after closing, this time corresponding to that one which is required for each cell of the furnace to be continuously fed from the receiving vessel.

According to a further embodiment of the invention two or more pneumatic conveying chutes per receiving vessel are provided, preferentially on opposing sides, each leading to a load arrangement, e.g. an aluminum melt furnace with a plurality of electrolytic cells.

According to another embodiment of the invention a monitoring and indicating device is provided for the valves. It determines whether the valve is actually closed, after a corresponding actuation signal for adjustment into the closing position has been transmitted to the valve from the fill level indicator and the controlling means, respectively. It has also to be determined whether the valve has been adjusted into the opening position after a fresh refilling of the receiving vessel has become necessary.

A conventional feed valve for such pneumatic conveying systems may be employed as the valve. According to one embodiment of the invention the valve is provided to be a valve ball with an axial passage as the valve member, mounted rotationally in a valve body. An elastic sealing ring is disposed on the side of the valve ball facing the conveying line and co-operates with the valve ball. On the opposite side of the valve ball, sufficient distance to the valve body is provided. To actuate the valve ball, e.g. a pneumatic actuation unit is used with which the valve ball is deviated to an angle of 90° from the opening position into the closing position and vice versa. The internal pressure in the receiving vessel is lower than in the pneumatic conveying line operating at overpressure. In the closed position of the valve a pressure difference at the sealing ring is consequently generated, so that the latter is inevitably pressed against the ball surface. The sealing action increases with increasing pressure difference.

The valve ball is sealed only unilaterally, on the side of the higher pressure. On the side of lower pressure no sealing exists, the body featuring a large spacing towards the ball instead. In this way the forces required to open and close the valve are reduced to a minimum. Furthermore, no deposition of bulk material can occur upon perpendicular incorporation of the feed valve, especially in the opened position. This increases the operational safety of the valve, because the forces required to actuate the valve remain calculable.

According to a further embodiment of the invention the conveying line is provided to be connected at opposing sides of a cylindrical body open-ended in the downward direction, and the valve body is provided to be disposed at the bottom end of the cylindrical body in a sealed manner.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the installation of the present invention is shown in FIG. 1.

Figure 1:
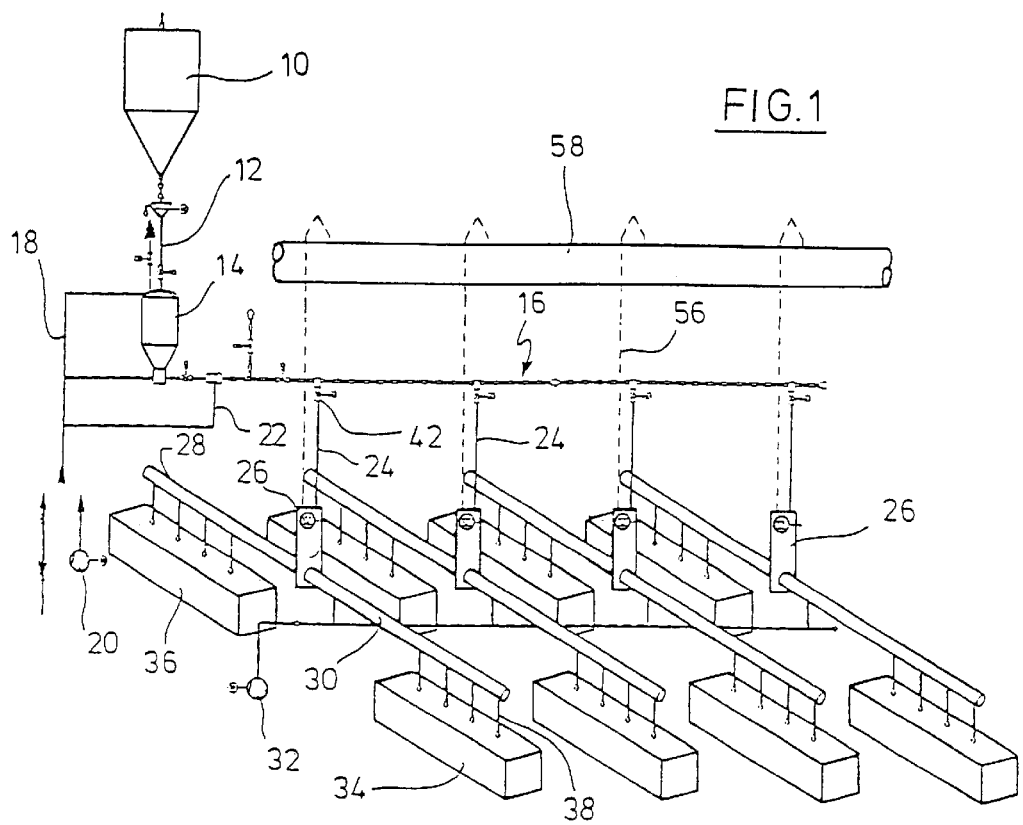
FIG. 1 is a schematic view of the installation in accordance with an embodiment of the present invention.

Referring to FIG. 1, the Installation includes a receiving silo 10 that is configured to contain bulk material such as aluminum oxide powder. The bulk material is conveyed via a line 12, which contains a sieve and at least one shut-off device which are not dwelled on further here, to a pressure vessel 14. The pressure vessel is connected to a pneumatic conveying line 16. The pressure vessel is in connection with a compressed-air pipe 18, which is joint to a compressor 20 or to a C compressed-air network. The compressed-air pipe 18 is conducted to the upper end of the pressure vessel 14 at the one hand, and to the bottom end on the other hand, as apparent from FIG. 1. Furthermore, a branching 22 immediately leads into the conveying line 16. By means of the demonstrated system bulk material, here aluminum oxide powder, may be conveyed through the conveying line 16, and if necessary over a relatively large distance without causing too high-pressure losses and pressure drops.

In distances branch lines 24 are attached to the pneumatic conveying line 16, each leading to a receiving vessel 26. Pneumatic conveying chutes 28, 30 are attached on opposing sides at the bottom end to the receiving vessels 26. The pneumatic conveying chutes 28, 30, which are fed with compressed-air by a compressor 32, are conducted to separate aluminum melting furnaces 34, 36, per cell of the furnaces 34 being provided one or several discharges for the conveying line 30, as illustrated e.g. with 38.

Figure 2:
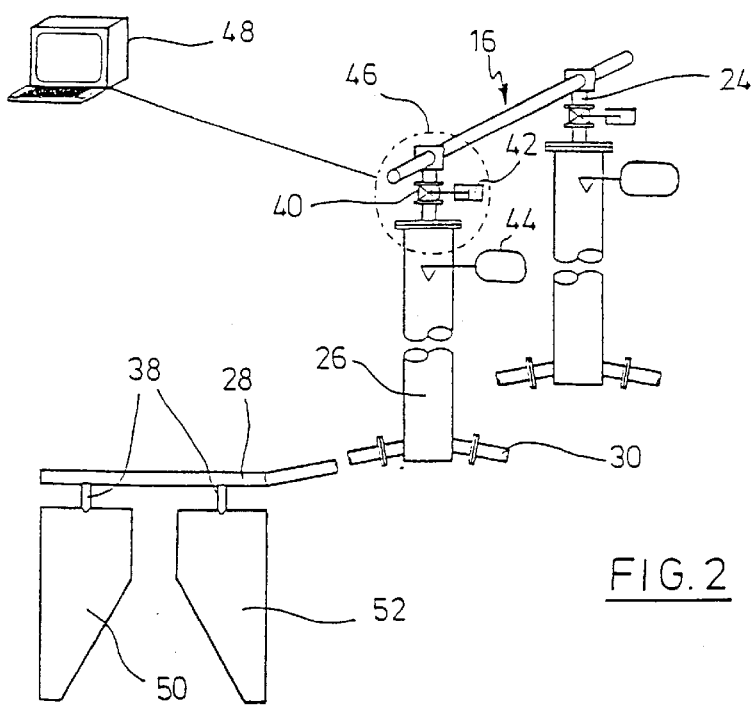
FIG. 2 is a detail view of the installation in accordance with an embodiment of the present invention.

Referring to FIG. 2, two receiving vessels 26 are depicted in an enlarged detail view. One recognizes that at each case a valve 40 is disposed in the branch line 24, which is actuated by a pneumatic actuation device 42.

In the receiving vessel 26, having e.g. a volume specific for the installation of 0.5 m$^3$, a fill level indicator 42 is provided which determines when the level in vessel 26 reaches a maximum value. In this case the valve 40 is then closed. It is reopened when either a predetermined time has passed, or when a minimum level is determined in the receiver 26 by a subsequent fill level measurement.

A monitoring device is also attached to the valves, formed e.g. by limit switches, as indicated by the chain dotted circle 46. This device determines whether the valve 40 has been adjusted to the intended position or not after issuing an actuation command to it, which may be determined e.g. with the aid of the limit switch. This may be indicated e.g. by a monitor 48.

It is further to be seen from FIG. 2 in which manner a conveying chute 28 is connected with two cells 50, 52 of a furnace 36 or 34.

The receiving vessels 26 are connected with an exhaust gas channel 58 via lines 56. The air directed out of the receiving vessels enters into these lines when they are filled via the pneumatic conveying line 16.

During operation, aluminum oxide powder is conveyed in the conveying line 16 and brought into a receiving vessel when valve 42 is opened. As the consumption of the aluminum melt furnaces 34, 36 is known, no special control or adjustment of the deliveries per time unit is required. Admittedly, it is also possible to provide a corresponding control or a stop of the conveying, respectively, when corresponding circumstances are given.

Figure 3:
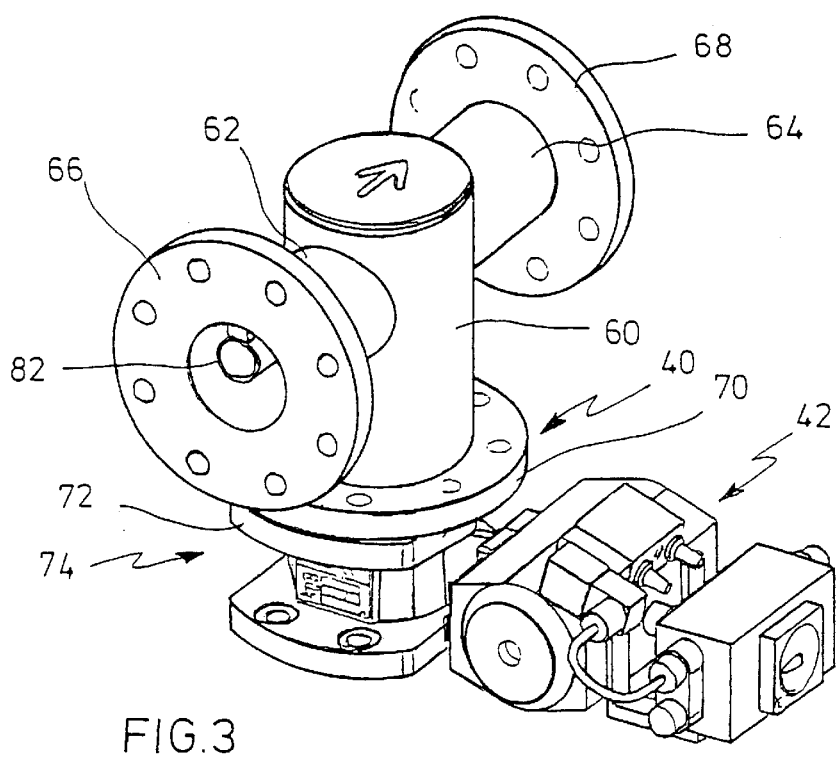
FIG. 3 is a perspective view of a feed valve in the installation depicted in FIG. 1.
Figure 4:
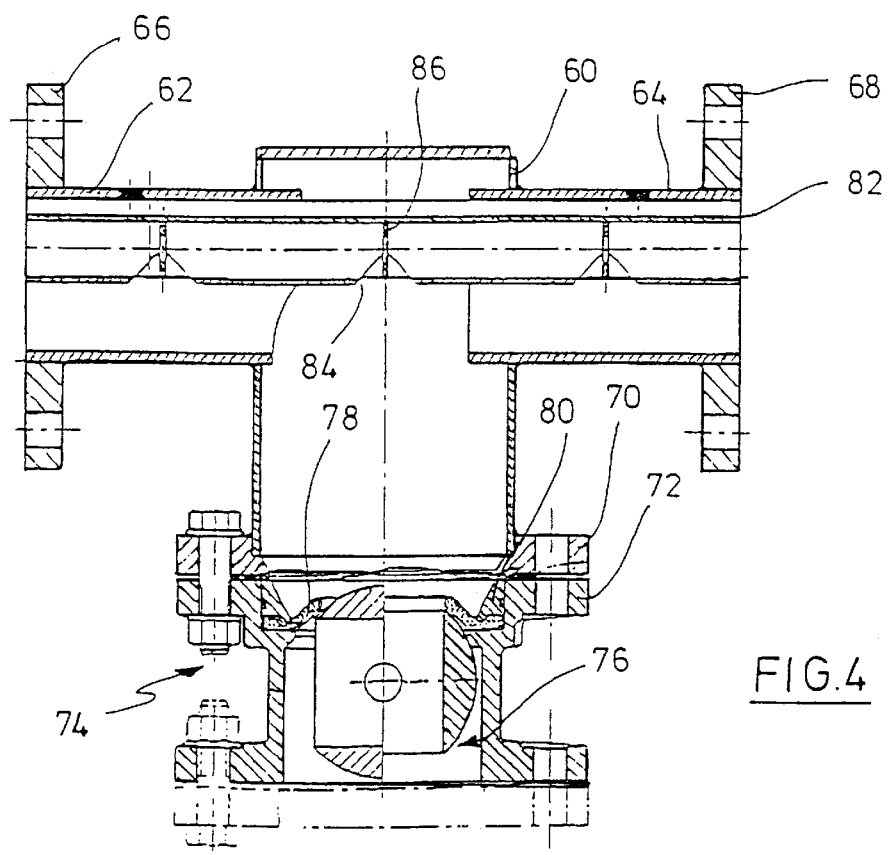
FIG. 4 is a sectional view of the feed valve depicted in FIG. 3.

Referring to FIG. 3 and FIG. 4, a valve 40 is illustrated in more detail. One recognizes from FIG. 3 that the valve is arranged at the bottom end of a cylindrical vessel 60, to which are connected on opposing sides pipe segments 62, 64, e.g. by welding. On the ends of the pipe segments 62, 64, flanges 66, 68 are disposed for junction with the corresponding end of the conveying line 16 (not shown). A flange 70 is welded to the bottom end of the cylindrical vessel 60 for connection with the upper flange 72 of the body 74 of the valve 40.

The cylindrical valve body 74 mounts a valve ball 76 around a horizontal axis. The actuation of the valve ball 76 for deviation at an angle of ±90° is performed by the pneumatic actuation device 42, which is not described in detail, because such devices are known in the related art.

As is recognizable from the two different positions in FIG. 4, with the aid of valve ball 76 the passage in downward direction from the cylindrical vessel 60 can be locked or unblocked. For this purpose an elastic ring sealing 78 is clamped between a shoulder of the body 74 and a locking 80, which is arched under tension towards the upward direction and is brought into close attachment with the outer side of the valve ball 40. In the locking position of the valve ball 76 a passage in downward direction is blocked with the aid of sealing 78. Because in the receiving vessel 26 a much lower pressure exists than in the conveying line 16, the pressure difference at the sealing ring 78 causes it to be pressed with a relatively high force against the outer side of the valve ball 76. For the rest, relatively much unoccupied space exists between the ball 78 and the body 74, so that material cannot be deposited to adversely affect the movement rate of the valve ball 76.

It still remains to be mentioned that, for example, a compressed-air pipe 82 with a smaller diameter is disposed in the conveying line 16 and therefore also in the pipe segments 62, 64, which comprises cut orifices 84 directed downwards, a screen 86 being disposed in their region. Such design of a pneumatic conveying line is actually known, however.

Figure 5:
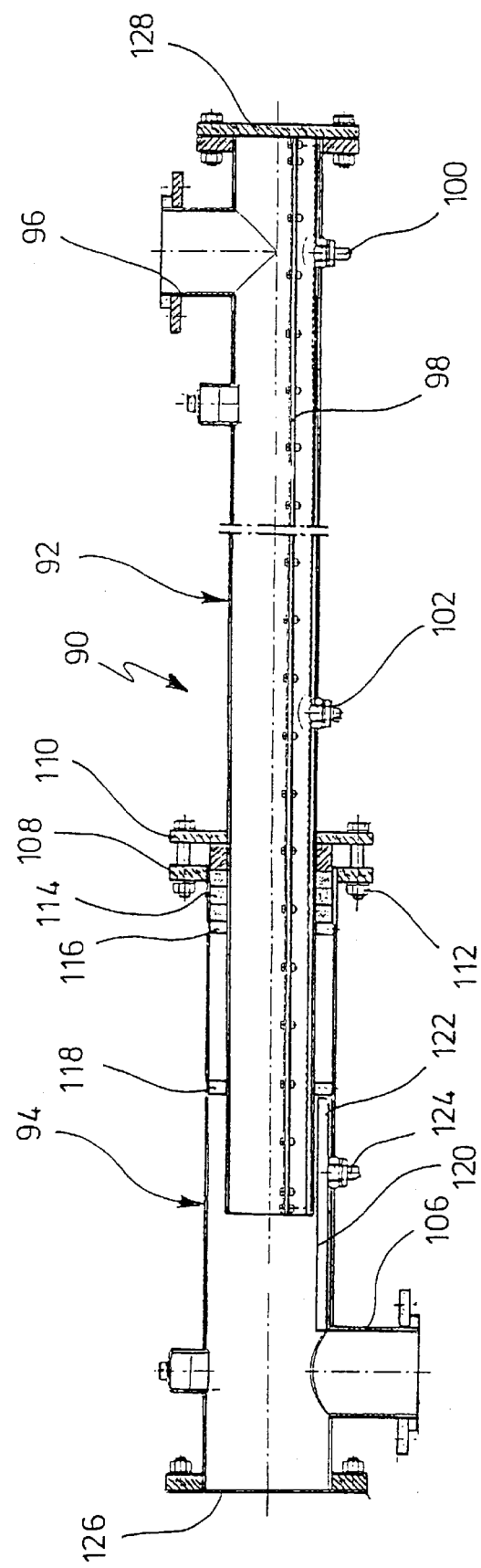
FIG. 5 is a sectional view of the conveying chute in the installation depicted in FIG. 1.

Referring to FIG. 5, an example for a conveying chute 90 is shown, which is composed of a first pipe-like chute segment 92 and a second pipe-like segment 94, the latter cooperating in a telescopic manner with the former. The chute segment 92 is connected via the lateral connecting piece 96 with the receiving vessel (not shown), e.g. the receiving vessel 26 according to FIGS. 1 and 2. It has an air-permeable chute knitting 98 in its bottom region, which is connected to compressed-air at 100 and 102, respectively, in order to disintegrate the material which enters the chute 90 via the connecting piece 96. The second segment 94 has a discharge piece 106, which is rigidly connected with a cell of an aluminum melting furnace or even with a further conveying chute. Thus, the conveying chute can be adjusted in longitudinal direction according to the spatial conditions.

The pipe-like segment 94 is provided at one end with a flange 108, which is connected with a ring 110 via screws 112 for clamping a sealing package 114, which at 116 on the pipe side is brought into close attachment with a ring which is welded to the segment 94. An additional ring 118 within the segment 94 serves for guidance between the segments 92, 94.

In the second segment 94 a perforated plate 120 is shown at 120, whereby a downward chute segment 122 is formed which is provided with a compressed-air connection 124 for disintegrating the material which arrives from the first section 92 into the second section 94, before it drops into the connecting piece 106. The end of the second segment 94 is closed with a blind flange 126.

It is also imaginable to provide with the second segment several connecting pieces in distances, each one connected with one electrolytic cell of an aluminum melt furnace. In this case, a disintegration device can also be provided between the connecting pieces or discharges, as shown at 120.

The first, chute segment 92 is also sealed with a blind flange at the right end 128.

The installation shown in the FIGS. 1 to 5, and described above, can be used for other loads of bulk material where the loads are arranged in groups, as well as upon spatial separation of the individual groups.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An installation for feeding a plurality of including cells of an aluminum melting furnace with bulk material, the bulk material including pulverized aluminum oxide, said installation comprising:

a silo (10) for storing the bulk material;

a pressure vessel or pump delivering machinery (14) coupled to the silo;

a conveying line (16) coupled to the pressure vessel;

a plurality of receiving vessels (26) coupled to the conveying line and disposed proximate the loads (34, 36), said receiving vessels being connected with the conveying line (16) via valves (40); and at least one pneumatic conveying chute or pneumatic pipe channel (28,30), respectively, connecting a receiving vessel (26) with a plurality of loads (50, 52) of the furnaces (34, 36), said conveying chute or pipe channel (28, 30), respectively, further including at least one discharge (38) per load (50, 52).

2. The installation as claimed in claim 1, wherein said receiving vessels (26) comprise a fill level indicator (48), said fill level indicator being connected with a controlling means for the related valve (40) and closing the valve (40), when the fill level has reached a predetermined height.

3. The installation as claimed in claim 2, wherein at least two pneumatic conveyer chutes or pneumatic pipe channels (28, 30), respectively, are connected with the receiver vessel (26).

4. The installation as claimed in claims 3, wherein a monitoring and indicating device (46) is provided for the feed valves (40), said device determining and/or indicating when a valve (40) does not have the preset switching condition.

5. The installation as claimed in claim 4, wherein a valve member of a valve ball (76) including an axial passage (77) is rotationally mounted in the body (74) of the valve (40), an elastic sealing ring (78) is disposed on the side of the valve ball (76) facing the conveying line (16) and being in sealed co-operation with said valve ball, whereas on the opposing side the valve ball (76) features a spacing to the wall of the valve body (74).

6. The installation as claimed in claim 5, wherein the conveying line (16) is connected at opposing sides to a cylindrical vessel open-ended in the downward direction, and the valve body (74) is disposed at the bottom end of said cylindrical vessel (60).

7. The installation as claimed in claim 6, wherein the conveying chute (90) comprises a first segment (92) that is rigidly connectable with the receiving vessel or a chute segment, and a second segment (94) having laterally at least one discharge (106) and co-operating in a telescopic manner with the first chute segment (92) or a further chute segment.

8. The installation as claimed in claim 7, wherein the second segment (94) between the discharge (106) and the first segment (92) is constructed as a pneumatic conveying chute (120, 124).

9. The installation as claimed in claim 8, wherein said first and second segments (92, 94) are constructed as pipes.

* * * * *